United States Patent [19]
DePue et al.

[11] Patent Number: 5,322,560
[45] Date of Patent: Jun. 21, 1994

[54] ALUMINUM FLAKE PIGMENT TREATED WITH TIME RELEASE CORROSION INHIBITING COMPOUNDS AND COATINGS CONTAINING THE SAME

[75] Inventors: Jeffrey S. DePue, Urbana, Ill.; Clint W. Carpenter, Royal Oak; Lynne G. Bemer, Northville, both of Mich.

[73] Assignee: BASF Corporation, Southfield, Mich.

[21] Appl. No.: 114,718

[22] Filed: Aug. 31, 1993

[51] Int. Cl.$^5$ ............................................. C09C 1/62
[52] U.S. Cl. ................... 106/404; 106/14.21; 106/14.44
[58] Field of Search ............. 106/14.21, 14.44, 404; 523/400

[56] References Cited

U.S. PATENT DOCUMENTS

| | | | |
|---|---|---|---|
| 4,828,615 | 5/1989 | Cape | 106/14.13 |
| 4,846,898 | 7/1989 | Natalie et al. | 428/469 |
| 4,855,032 | 12/1989 | Okai et al. | 75/251 |
| 5,039,343 | 8/1991 | Umeda et al. | 106/404 |
| 5,093,391 | 3/1992 | Barsotti et al. | 523/400 |
| 5,215,579 | 6/1993 | Keemer et al. | 106/404 |

*Primary Examiner*—Karl Group
*Assistant Examiner*—Chris Gallo
*Attorney, Agent, or Firm*—Anne G. Sabourin

[57] ABSTRACT

The invention is a slightly water-soluble, time release corrosion inhibitor compound for treating aluminum flake pigment. The corrosion inhibitor is the reaction product of a water-soluble metal salt including metals selected from the group consisting of yttrium and rare earth metals and an anionic metal salt including transition metal oxo-complexes and soluble salts of silicon and mixtures thereof. The corrosion inhibitor is useful for preventing hydrogen gassing of aluminum pigment particles. The compound is particularly useful for preventing gassing of bare and chromated aluminum pigment particles in aqueous compositions and in water-borne coating compositions having a basic pH. The pigment particles used in combination with the corrosion inhibitors of the present invention experience significantly less hydrogen gassing in a high pH aqueous environment and in water-borne coating compositions having high pH, than aluminum flake pigment particles and coatings without the corrosion inhibitor. The corrosion inhibitor is also effective when combined with a second corrosion inhibitor, such as a water-soluble salt of yttrium or rare earth metal in a coating composition.

20 Claims, No Drawings

ALUMINUM FLAKE PIGMENT TREATED WITH TIME RELEASE CORROSION INHIBITING COMPOUNDS AND COATINGS CONTAINING THE SAME

FIELD OF THE INVENTION

The present invention pertains to the field of aluminum flake pigments made corrosion resistant by treatment with a time released corrosion inhibitor compound. The invention also pertains to coating compositions containing the treated aluminum flake pigments.

BACKGROUND OF THE INVENTION

The present invention pertains to corrosion inhibition of treated and untreated aluminum flake pigments alone and for use in waterborne coating compositions. Aluminum flake pigments are slightly reactive in an aqueous environment having a basic pH, such as aqueous coating compositions. The pH of the water-borne acrylic coating compositions typically ranges from 8.0-9.0, and the polyurethane coating compositions have a pH typically ranging from 7.5 to 8.0.

In a basic pH environment, the aluminum pigment reacts with water to produce hydrogen gas and aluminum hydroxide. The reaction is a form of corrosion and converts the pigment to a hydrated oxide form unsuitable for pigment use, as it destroys the metallic pigmentation properties of the mirrorlike particles. The amount of corrosion is measured by the amount of hydrogen gas produced over a given period of time.

Once formation of aluminum hydroxide begins, corrosion accelerates. This is because the $OH^-$ ions cause the pH of the environment to further increase, resulting in the increased formation of aluminum hydroxide.

The aluminum pigment deteriorates over time due to oxidation, as it remains in continuous contact with the basic pH environment of the coating composition. Coating compositions containing the pigment are often stored for 6 months or more before application, which can result in significant corrosion of the pigment. If this corrosion remains unchecked the coating composition may be unusable.

An additional factor affecting degradation of the pigment in a coating occurs when the paint is pumped from the storage site to the application site. This distance is often several blocks in length. The pumping action required to transport the paint this considerable distance is severe and results in breaking of the pigment particles, which exposes even more of the surface area of the pigment to corrosion. Corrosion inhibition can be achieved if the rates of these reactions, or any partial steps involved, can be decreased.

It has been found that time released corrosion inhibitor compounds inhibit corrosion in aluminum flake pigment particles in a basic aqueous environment. The corrosion inhibitor compound is the reaction product of water-soluble compound of yttrium or rare earth metal and an anionic metal complex including compounds selected from the group consisting of soluble salts of transition metal oxo-complexes complexes, soluble silicate salts and mixtures thereof.

It has further been discovered that aluminum flake pigment treated with the corrosion inhibitor compound is highly effective to inhibit the corrosion of the pigment particles in water-borne coating compositions. This is significant because, as explained above, the physical factors such as pumping and extended storage of coating compositions expose the pigment to increased corrosion at the high pH of water-borne coating systems. Use of the treated pigment significantly reduces the corrosion and/or degradation of aluminum flake pigment used in metallic coatings.

SUMMARY OF THE INVENTION

The present invention relates to the discovery that aluminum flake pigment particles can be treated with time released corrosion inhibitor compounds that are only slightly soluble, to inhibit corrosion in aluminum flake pigment particles in a basic aqueous environment. The corrosion inhibitor compound is the reaction product of a water soluble compound of yttrium or a rare earth metal and an anionic metal complex including compounds selected from the group consisting of soluble salts of transition metal oxo-complexes, soluble silicate salts and mixtures thereof. The corrosion inhibitor compound is only slightly soluble in an aqueous environment. The corrosion inhibitor is effective with both untreated aluminum, sometimes referred to as "bare" aluminum and aluminum that has been surface treated with chromates or other corrosion inhibiting agents. Effectiveness of the corrosion inhibitor is evidenced by decreased hydrogen gassing in a basic pH environment. The particularly useful corrosion inhibitors include the reaction product of water-soluble compounds including yttrium, lanthanum, or rare earth metals of the lanthanide series (i.e. atomic numbers of from 58 to 71) and an anionic metal complex including a soluble salt of silicon or of transition metal oxo-complexes where the transition metal is selected from the group consisting of titanium, vanadium, chromium, zirconium, niobium, molybdenum, hafnium, tantalum and tungsten and mixtures thereof.

The aluminum flake pigment particles are treated with the corrosion inhibitor by forming a slurry of aluminum pigment and a corrosion inhibitor and water. When pigment is in admixture with mineral spirits, solvent is added to separate the mineral spirits from the pigment. The pigment remains in mixture with the solution for a period of time ranging from 0.5 to 4 hours, to form the protective coating of corrosion inhibitor on the aluminum flake pigment.

Water-borne coating compositions containing aluminum flake pigment particles may be formulated with pigment that has been treated with the corrosion inhibitor of the present invention or untreated pigment may be used and the corrosion inhibitor added directly to the coating composition. The corrosion inhibitor is particularly useful for coating compositions containing a film forming resin which is an acrylic or a polyurethane resin.

The corrosion inhibitors of the present invention are also useful when used in combination with water-soluble metal salts of yttrium and the rare earth metals. Particularly useful salts include trivalent cerium, yttrium and lanthanum salts and tetravalent cerium salts.

DETAILED DESCRIPTION OF THE INVENTION

The present invention is directed to a corrosion inhibitor composition for aluminum flake pigment particles, a method for treating the aluminum flake pigment with the corrosion inhibitor and coatings containing aluminum flake pigment and the corrosion inhibitor.

According to the present invention, the corrosion inhibitor for the aluminum flake pigment is only slightly water-soluble and functions in a time release manner. For purposes of the present invention, slightly soluble is defined as no more than $10^{-3}$ molar concentration in a saturated aqueous solution. The corrosion inhibitor is the reaction product of water-soluble metal salts of yttrium or rare earth metals and an anionic water-soluble salt selected from the group consisting of transition metal oxo-complexes, silicate salts and mixtures thereof. The preferred water-soluble metal salt for reaction with the anionic metal salt is cerium nitrate. The useful transition metal oxo-complexes, include transition metals selected from the group consisting of titanium, vanadium, chromium, zirconium, niobium, molybdenum, hafnium, tantalum and tungsten and mixtures thereof.

The preferred water-soluble salts of transition metal oxo-complexes useful for purposes of the present invention include those selected from the group consisting of sodium tungstate, sodium metavanadate, sodium orthovanadate, sodium molybdate, sodium metasilicate, lithium niobate, and mixtures thereof.

The corrosion inhibitors of the present invention are formed by reacting the water-soluble metal salt of yttrium or rare earth metals with a transition metal oxo-complex or a silicate salt in aqueous solution. The resultant reaction product is then filtered and oven dried. Products of the present invention were dried for approximately 6 hours. The water-soluble metal salt is present in an amount between 75 and 25 percent by weight, based on the total weight of the reactants. The transition metal oxo-complex or silicate salt is present in an amount between 25 and 75 percent by weight, based on the total weight of the reactants.

The aluminum flake pigment is treated with the corrosion inhibitor by forming a slurry of deionized water, corrosion inhibitor and pigment. If the pigment is dispersed in mineral spirits, solvent is added to disperse the pigment, to facilitate maximum contact of the pigment particles with the corrosion inhibitor. Suitable solvents for this purpose include ethylene glycol monobutyl ether, n-propanol, propylene glycol monomethyl ether or propylene glycol monobutyl ether.

The salt solution preferably contains deionized water and a solvent such as butyl cellosolve, n-propanol, propylene glycol monomethyl ether or propylene glycol mono butyl ether. The water is present to dissolve the metal salt.

The slurry comprises aluminum flake pigment present in an amount between 30% and 65% by weight, corrosion inhibitor present in an amount between 0.01% and 5.0% by weight, water present in an amount between 10% and 70% by weight, and solvent present in an amount between 0% and 30% by weight, where all weights are based on total weight of the aluminum slurry. The aluminum pigment remains in contact with the salt solution for a period of 0.5 hour to 24 hours. The contact time must be adequate for formation of a rare earth metal or transition metal oxide coating on the aluminum flake pigment. The aluminum flake pigment is subsequently filtered and dried to provide the corrosion resistant aluminum flake pigment composition.

In the present invention the aluminum pigment treated with the solution of the corrosion inhibitor, is tested to determine the improvement in resistance of the pigment to corrosion. Corrosion tests were run on untreated aluminum flake pigment samples, pigment samples treated with the corrosion inhibitor, and coating compositions containing pigment and the corrosion inhibitor. The corrosion resistance is determined by a decrease in the amount of hydrogen gas produced by the treated pigments compared to the untreated pigments, in a basic solution of sodium tetraborate, $Na_2B_4O_7$, (borax) having a pH of about 8.0. The method is described below and the gassing results for the aluminum flake pigments of the present invention are set forth in Table 1.

The method for measurement of gassing in the aluminum flake pigment samples is to place a solution of sodium tetraborate in a gassing container. For purposes of the present invention the concentration of the borate solution ranged from 0.0091 M to 0.0110 M. The gassing apparatus is a 250 ml gas washing bottle attached to a bubble counter with two chambers. The lower chamber is filled with water, through the side neck of the bubble counter. Hydrogen gas formed by release of the $H^+$ ions from the reaction of the aluminum and water, presses water from the lower chamber into the upper chamber of the bubble counter. The volume of water displaced from the lower chamber equals the volume of hydrogen gas generated.

The solution is thermally equilibrated to 60° C. Next the aluminum flake pigment is added and equilibrated to 60° C. Gas evolution is then measured over a period of about 1 to 2 hours.

As shown in Table 1, following the Detailed Description, pigment treated with the corrosion inhibitor of the present invention showed improved gassing results in comparison to untreated pigment.

The slightly soluble corrosion inhibitor of the present invention is also useful in aqueous coating compositions containing the aluminum flake pigment. The corrosion inhibitor is particularly effective in coating compositions when used as a secondary corrosion inhibitor, in combination with a primary corrosion inhibitor which is a water-soluble salt of trivalent or tetravalent salt of cerium, yttrium or lanthanum. Water-soluble salts useful as a primary corrosion inhibitor compound for treating the aluminum pigment include cerium sulfate, cerium triacetate, cerium isopropoxide, ammonium cerium nitrate, yttrium triacetate, lanthanum triacetate and cerium nitrate.

When used in combination in a coating composition, the water-soluble metal salt used as the primary corrosion inhibitor is present in an amount of between 0.01% and 5.0% by weight based on total pigment weight and the slightly soluble salt used as the secondary corrosion inhibitor is used in an amount between 0.01% and 5.0 % by weight based on the combined weight of the corrosion inhibitor and pigment. The slightly soluble corrosion inhibitor has a "time release" effect when used with the primary water-soluble salt. This "time release" effect is theorized to occur as follows.

The primary water-soluble salt reacts before the less soluble corrosion inhibitor of the present invention to form a protective coating of rare-earth metal or transition metal oxide on the pigment. Most of the time release corrosion inhibitor remains unreacted in the form of a precipitate, due to its relatively insoluble nature.

It is hypothesized that the precipitate of the relatively water-insoluble corrosion inhibitor of the present invention provides an additional source of rare earth metal, yttrium or transition metal to form a metal oxide protective coating at any site on the pigment unprotected by the metal oxide film provided by the more soluble trivalent and tetravalent salts of cerium, yttrium and lanthanum. Unprotected sites often occur when the cerium, yttrium or lanthanum oxide film is chipped away by agitation or corrosion of the pigment, or when the supply of trivalent or tetravalent salts of cerium, yttrium or lanthanum are depleted. The corrosion inhibitor serves to replace the protective coating on the pigment that is dislodged during prolonged storage or during pipeline transport, (e.g. via pumping), of the coating from storage to application site.

To form a waterborne coating composition, bare or chromated aluminum flake pigment and corrosion inhibitor may be combined with a film-forming resin and water. Other ingredients well-known in the art to be useful in such compositions may be included, such as crosslinkers and other resins, plasticizers, additional cosolvents to aid in stabilization or application of the composition, rheology control agents, other pigments, UV light stabilizers and antioxidants, catalysts and fungicides.

Suitable film-forming resins are water-dispersible or water-soluble, ionic or nonionic resins. Anionic or nonionic resins are preferred for use in topcoat applications. The resins may be acrylic, vinyl, polyurethane, polyester, alkyd, epoxy, or other polymers known to be useful in films. Examples of water-dispersible polymers used for topcoats are contained in U.S. Pat. Nos. 4,794,147; 4,791,168; and 4,518,724, all of which are hereby incorporated by reference. Such systems typically also include a crosslinker, such as aminoplast resins, polyamines, blocked polyisocyanates, and so on, depending on the functionality available for crosslinking on the film forming resin. For example, hydroxyl-functional acrylic or polyurethane resins can be cured using aminoplast resins. For this purpose, melamine-formaldehyde resins are particularly preferred. Melamine-formaldehyde resins of the kind contemplated are commercially available from, for example, Monsanto Co., St. Louis, Mo.; and American Cyanamid, Wayne, N.J. A polymeric-type melamine may be used, particularly when the film forming resin is anionically stabilized. Such polymeric-type melamines do not require strong acid catalysis. When the film-forming resin is nonionically stabilized, a polymeric melamine may be used or a monomeric melamine may be used in conjunction with a strong acid catalyst like a sulfonic acid or blocked sulfonic acid.

The film-forming resin or the crosslinker may comprise a functionality that can react with a reactive group on the compound of the invention during the curing step. The polymeric network formed during cure would then include a residue of the compound, covalently bonded to the polymeric network. The ability of the compound to react during the curing step is independent of its function in surface modifying the metallic flake pigment.

Additional cosolvents may be added to aid in stabilization or application of the composition. The more preferred solvents are acetates such as butyl acetate, hexyl acetate, and octyl acetate; glycol ethers and glycol ether acetates, such as propylene glycol ether and propylene glycol monomethyl ether acetate; and ketones, such as methyl propyl ketone, methyl isobutyl ketone, and methyl hexyl ketone. Glycol ethers and glycol ether acetates are especially preferred.

Other pigments, if used, are preferably incorporated as pastes or dispersions prepared by using grinding resins or pigment dispersants according to methods well known in the art. The term "pigments" is meant to encompass organic and inorganic compounds that are colored materials, fillers, flake materials, and other materials of kind that the art normally names as pigments. If pigments other than aluminum flake pigment treated with the corrosion inhibitor of the present invention are included, they are usually used in an amount of 1% to 200%, based on the total solid weight of the reactants. The surface-modified metallic flake pigments used according to the invention are typically used at amounts of 1% to 30%, based on the total solid weight of the reactants.

It may be desirable to include small amounts of rheology control agents, for example fumed silicas, hectorite clays, bentonite clays, or cellulosics like cellulose acetate butyrate. Such materials are usually used at levels of less than 10% based on the total solid weight of reactants. Rheology control agents are used to control the flow and leveling of the composition during application and curing steps. The rheology control agent is also useful for controlling the metallic appearance of the coating. Such materials may help "fix" the pigment flake surface in an alignment parallel to the surface of the coating to maximize the brightness when viewed head-on and to maximize the darkness when viewed obliquely.

Coating compositions of the present invention are generally prepared by the methods set forth in Examples 7 and 8, following the Detailed Description. The prepared coating composition is applied to a substrate by any of a number of conventional means, for example by spraying, brushing, dipping or flowing. The preferred methods of application are by spraying or electrostatic spraying. These methods are widely used, especially in the application of automotive coatings. For example, the coating may be applied using a Model 62 siphon spray gun (available from Binks Manufacturing Corp., Franklin Park, Ill.) with 50-80 psi atomizing air pressure.

The substrate to which the coating composition of this invention is to be applied may be, for example, metal, ceramic, plastic, glass, paper, or wood. The substrate may also be any of the aforementioned materials precoated with this or another coating composition. The coating compositions of this invention have been found to be particularly useful over precoated steel or plastic substrates in automotive applications. They are particularly suited for use over primed automotive substrates as topcoat formulations or basecoat formulations that are overcoated with clearcoat formulations.

After application of the coating composition to the substrate, the coating is cured, preferably by heating at a temperature and for a length of time sufficient to cause the conversion of all or nearly all of the reactive groups. The cure temperature is usually from 115° C. to 180° C., and the length of cure is usually 15 minutes to 60 minutes. Preferably, the coating is cured at 120°-150° C. for 20 to 30 minutes. The thickness of the cured coating can be from 1 to 150 microns, but when used as an automotive topcoat or basecoat the coating thickness is generally from 10 to 70 microns.

In a preferred embodiment of the invention, the coating composition of the present invention is used as a basecoat for a color-plus-clear composite coating. The basecoat contains the aluminum pigment and provides the color coating. It is overcoated with a transparent topcoat layer, known commonly in the art as a clearcoat. The basecoat may be cured before the clearcoat is applied or the basecoat may be given a wet-on-wet application of a clearcoat. By the term "wet-on-wet" it is meant that after application the basecoat is allowed to flash, or dry, to remove most of the water and other solvent that it contained, but it is not cured before the clearcoat composition is applied. After the clearcoat composition is applied, it is allowed to flash or dry for a period of time, then the basecoat and the clearcoat are cured together.

The clearcoat may be a coating composition according to this invention or another composition known to the art to have utility as a clearcoat. The clearcoat does not necessarily need to use the cure mechanism used by the basecoat, although the cure mechanisms used must not interfere with one another.

The basecoat may be applied in one or two layers, with a short period between application of layers to allow solvent and water to evaporate (termed a "flash" period). After application, the basecoat may be further dried, preferably at a slightly elevated temperature, as in a 120° F. oven, for a period of 5 to 20 minutes before the clear coat composition is applied. The clearcoat composition is preferably applied by spraying, in one layer, or preferably two layers with a short flash between layers. The clearcoat composition is allowed to flash under ambient or heated conditions for 1-20 minutes. The uncured coatings are then cured, usually by thermoset methods as described herein above. The resulting appearance and physical properties are excellent. The addition of the corrosion inhibitor does not decrease adhesion or adversely affect the appearance of the coating composition.

Aluminum flake containing coating compositions prepared according to the present invention applied to enamel substrates were tested for gassing to determine corrosion resistance of the aluminum flake pigment in the basic pH environment of the coating. The results are set forth in Table 3.

The coating composition was tested for gassing in the gassing apparatus described above. A 250 ml sample of enamel containing aluminum flakes is filled into the gas washing bottle. The assembled apparatus containing the sample is placed in a 40° C. bath and allowed to equilibrate for 60 minutes. After allowing for equilibration, the screw cap is tightened securely. The sample is tested in the 40° C. water bath at 24 hour intervals to measure the amount of hydrogen gas generated. The acceptable maximum level of generated gas is 0 mils after 30 days.

As shown in Table 3, the coating composition containing the corrosion inhibitor demonstrated no gassing after 30 days.

The following non-limiting examples are provided to further illustrate the invention.

EXAMPLES

In Examples 1-4, bare aluminum pigment was obtained from Obron Atlantic Corp., Painesville, Ohio.

EXAMPLE 1

Aluminum Flake Pigment Treated with Cerous Metavanadate

Cerous metavanadate was formed by reacting 59.36 grams cerous nitrate and 50.0 grams sodium metavanadate. The resultant cerous metavanadate reaction product was filtered and the filtrate oven dried at 110° C. for six hours.

The cerous metavanadate thus obtained, was combined in an amount of 0.198 grams, with 0.202 grams of bare aluminum pigment.

EXAMPLE 2

Aluminum Flake Pigment Treated with Cerous Silicate

Cerous silicate was formed by reacting 30.0 grams cerous nitrate and 12.65 grams sodium silicate. The resultant cerous silicate reaction product was filtered and the filtrate oven dried at 110° C. for six hours.

The cerous silicate thus obtained, was combined in an amount of 0.201 grams, with 0.196 grams of bare aluminum pigment.

EXAMPLE 3

Control 1.009 grams untreated bare aluminum pigment were tested for gassing in a stock borax solution.

EXAMPLE 4

Aluminum Flake Pigment Treated with Cerous Metavanadate

Cerous metavanadate was formed by reacting 15.0 grams cerous nitrate and 12.63 grams sodium metavanadate. The resultant cerous metavanadate reaction product was filtered and the filtrate oven dried at 110° C. for six hours.

The cerous metavanadate thus obtained, was combined in an amount of 0.2228 grams, with 1.006 grams of bare aluminum pigment.

EXAMPLE 4a

Control 1.009 grams untreated bare aluminum pigment were tested for gassing in a stock borax solution.

EXAMPLE 5

Preparation of Isocyanate Functional Acrylic Copolymer 1

231.3 g (2.02 mol) of methyl amyl ketone was charged to a reaction vessel fitted with stirrer and condenser. The solvent was heated to reflux temperature and maintained at reflux for the duration of the reaction. A blend consisting of 94.8 g (0.91 mol) styrene, 160.7 g (1.13 mol) butyl methacrylate, 144.8 g (1.13 mol) butyl acrylate and 271.7 g (1.35 mol) 1-(1-isocyanato-1-methylethyl)-3-(1-methylethenyl) benzene, hereafter referred to as TMI®, available from American Cyanamid Co., Wayne, N.J. 07470, was slowly added over a period of three hours. 67.2 g of 50% active tert-butyl peracetate was added to the monomer blend to initiate the vinyl polymerization. 33.6 g of initiator along with 58.0 g of methyl amyl ketone were added one half hour after the addition of monomer was complete. The mixture was heated for an additional 1.5 hours and then cooled and collected for further modification.

EXAMPLE 6

Copolymer Modified With Hydroxyethyl Ethylene Urea (HEEU)-Grind Resin 112.0 g (0.56 mol, average molecular weight of 2000) methoxy polyethylene glycol, 16.5 g (0.13 mol) hydroxyethyl ethylene urea, 4.0 g of a 1% solution of dibutyltin dilaurate in methyl propyl ketone, and 300.0 g isocyanate-functional acrylic prepared in accordance with Example 6, were charged to a reaction vessel fitted with a stirrer and condenser. The mixture was heated to 120° C. and maintained at that temperature for not more than two hours. At the end of this time, the mixture was titrated and the result indicated that all of the methoxy polyethylene glycol and hydroxyethyl ethylene urea had reacted with the isocyanate groups. The remainder of the isocyanate functionality was capped with 7.5 g (0.12 mol) monoethanolamine which was added over a period of 5-10 minutes while the mixture was stirred and the temperature was approximately 90° C. The temperature then rose to 100° C. and then subsided. When the exothermic reaction had ceased, the mixture was titrated. Titration revealed no remaining isocyanate functionality. The material was subsequently dispersed with 10.0 g (0.55 mol) of deionized water.

EXAMPLE 7

Coating Composition Containing Chromated Aluminum Flake Pigments With Cerous Molybdate and Cerium Triacetate and HEEU Polar Functional Compound A slurry was prepared from the following ingredients.

| | |
|---|---|
| Cymel ® 327[1] | 20.60 |
| 2-ethyl hexanol | 17.0 |
| Dispersant resin containing 2-hydroxyethyl ethylene urea (HEEU) based dispersant grind resin (Ex. 7) | 14.70 g |
| Cerium triacetate | 0.2 g |
| Chromated aluminum flake pigment[2] | 29.2 g |
| Propylene glycol propyl ether | 10.0 g |
| Cerous Molybdate | 0.1 g |
| Deionized water | 15.0 g |

[1] A methylated melamine formaldehyde resin, sold under the trademark Cymel ® and available from American Cyanamid Co.
[2] Chromated aluminum pigment from Obron Atlantic Corp., Painesville, Ohio.

*[1] A methylated melamine formaldehyde resin, sold under the trademark Cymel ® and available from American Cyanamid Co.
*[2] Chromated aluminum pigment from Obron Atlantic Corp., Painesville, Ohio.

First a mixture of the Cymel ® 327 and 2-ethyl hexanol was prepared. Next the HEEU based resin was added to the mixture. In a separate vessel the cerium triacetate, cerium molybdate and water were combined with mixing and then added to the first mixture. To this mixture was added propylene glycol propyl ether. The aluminum pigment was then added. The mixture was then agitated until smooth.

Next the following ingredients were added as described below.

| | |
|---|---|
| Emulsion resin[3] | 180.7 g |
| Dimethylethanolamine 5% (DMEA) | 14.5 g |
| Viscalex ® HV-30[4] | 6.7 g |
| Deionized water | 74.4 g |
| Propylene glycol propyl ether | 60.6 g |

[3] Acrylic uncrosslinked core-shell polymeric emulsion resin having 45% non-volatile content.
[4] Rheology control agent sold under the trademark Viscalex ® and available from Allied Colloids Inc., Suffolk, Va.

*[3] Acrylic uncrosslinked core-shell polymeric emulsion resin having 45% non-volatile content.
*[4] Rheology control agent sold under the trademark Viscalex ® and available from Allied Colloids Inc., Suffolk, Va.

First the resin and 5% DMEA were combined to provide a resin with a pH of 8. In a separate container the Viscalex ® and water were combined and then added slowly to the resin. Next, the propylene glycol propyl ether was added to the mixture. Finally, the aluminum slurry was added to the mixture, with mixing for 5-10 minutes. The coating was then neutralized to a pH of 8.5 with additional 32.6 g of 5% DMEA. After 2 days the paint was reduced to spray viscosity with the addition of 44.9 g deionized water to achieve a viscosity of 91.2 cP on a Bohlin V-88 viscometer.

EXAMPLE 8

Coating Composition Containing Chromated Aluminum Flake Pigments With Cerous Tungstate and Cerium Triacetate and HEEU Polar Functional Compound A slurry was prepared from the following ingredients.

| | |
|---|---|
| Cymel ® 327[1] | 20.60 |
| 2-ethyl hexanol | 17.0 |
| Dispersant resin containing 2-hydroxyethyl ethylene urea (HEEU) based dispersant grind resin (Ex. 7) | 14.70 g |
| Cerium triacetate | 0.2 g |
| Chromated aluminum flake pigment[2] | 29.2 g |
| Propylene glycol propyl ether | 10.0 g |
| Cerous Tungstate | 0.1 g |
| Deionized water | 15.0 g |

[1] A methylated melamine formaldehyde resin, sold under the trademark Cymel ® and available from American Cyanamid Co.
[2] Chromated aluminum pigment from Obron Atlantic Corp., Painesville, Ohio.

*[1] A methylated melamine formaldehyde resin, sold under the trademark Cymel ® and available from American Cyanamid Co.
*[2] Chromated aluminum pigment from Obron Atlantic Corp., Painesville, Ohio.

First a mixture of the Cymel ® 327 and 2-ethyl hexanol was prepared. Next the HEEU based resin was added to the mixture. In a separate vessel the cerium triacetate, cerium molybdate and water were combined with mixing and then added to the first mixture. To this mixture was added propylene glycol propyl ether. The aluminum pigment was then added. The mixture was then agitated until smooth.

Next the following ingredients were added as described below.

| | |
|---|---|
| Emulsion resin[3] | 180.7 g |
| Dimethylethanolamine 5% (DMEA) | 10.4 g |
| Viscalex ® HV-30[4] | 6.7 g |
| Deionized water | 74.4 g |
| Propylene glycol propyl ether | 60.6 g |

[3] Acrylic uncrosslinked core-shell polymeric emulsion resin having 45% non-volatile content.
[4] Rheology control agent sold under the trademark Viscalex ® and available from Allied Colloids Inc., Suffolk, Va.

*[3] Acrylic uncrosslinked core-shell polymeric emulsion resin having 45% non-volatile content.
*[4] Rheology control agent sold under the trademark Viscalex ® and available from Allied Colloids Inc., Suffolk, Va.

First the resin and 5% DMEA were combined to provide a resin with a pH of 8. In a separate container the Viscalex ® and water were combined and then added slowly to the resin. Next, the propylene glycol propyl ether was added to the mixture. Finally, the aluminum slurry was slowly added to the mixture, with mixing for 5-10 minutes. The coating was then neutralized to a pH of 8.5 with additional 31.6 g of 5% DMEA. After 2 days the paint was reduced to spray viscosity with the addition of 116.6 g deionized water to achieve a viscosity of 101.8 cP on a Bohlin V-88 viscometer.

TABLE 1

Gassing Results For Al Pigment Treated with Cerous Silicate and Cerous Metavanadate in 0.0091 M Solution of $Na_2B_4O_7$

| Example | ML HYDROGEN GAS PER HOUR[a] | | | |
|---|---|---|---|---|
| | .53 Hr | 1.0 Hr | 1.4 Hr | 1.75 Hr |
| 1 | 14 | 30 | 40 | 51 |
| 2 | 10 | 36 | 72 | 105 |
| 3 | 24 | 68 | 98 | 132 |

[a]time measured from when samples sealed in gassing jars.

TABLE 2

Gassing Results For Al Pigment Treated with Cerous Metavanadate and Control in 0.0091 M Solution of $Na_2B_4O_7$

| Example | ML HYDROGEN GAS PER HOUR[a] | | | |
|---|---|---|---|---|
| | .17 Hr | .33 Hr | .75 Hr | .97 Hr |
| 4 | 25 | 48 | 90 | 120 |
| 4a | 48 | 164 | 408 | 504 |

[a]time measured from when samples sealed in gassing jars.

TABLE 3

Gassing Results for Coatings Prepared According to Ex. 7 and Ex. 8

| SAMPLE | CORROSION INHIBITOR | ML HYDROGEN GAS PER TIME | | |
|---|---|---|---|---|
| | | 7 DAYS | 21 DAYS | 30 DAYS |
| Ex. 7 | $Ce_2(MoO_4)_3$[a] | 0 | 0 | 0 |
| Ex. 8 | $Ce_2(WO_4)_3$[b] | 13 | 17 | 16 |

[a]$Ce_2(MoO_4)_3$ is cerium molybdate.
[b]$Ce_2(WO_4)_3$ is cerirum tungstate.

We claim:

1. A composition, comprising aluminum flake pigment particles surface modified with a time released, slightly water soluble, corrosion inhibitor compound, wherein the inhibitor compound comprises the reaction product of
   a) a water-soluble metal salt of a metal selected from the group consisting of yttrium and rare earth metals, and
   b) an anionic water-soluble metal salt selected from the group consisting of transition metal oxo-complexes, silicon salts and mixtures thereof.

2. The composition of claim 1, wherein the water-soluble salts of transition metal oxo-complexes include transition metals selected from the group consisting of titanium, vanadium, chromium, zirconium, niobium, molybdenum, hafnium, tantalum and tungsten and mixtures thereof.

3. The composition of claim 1, wherein the water-soluble metal salt (a) is cerous nitrate.

4. The composition of claim 1, wherein the salt of the transition metal oxo-complex includes a transition metal selected from the group consisting of tungsten, vanadium, molybdenum, and niobium.

5. The composition of claim 1, wherein the anionic, water-soluble metal salt (b) is selected from the group consisting of sodium metasilicate, sodium tungstate, sodium metavanadate, sodium orthovanadate, sodium molybdate, lithium meta-niobate, and mixtures thereof.

6. The composition of claim 1, wherein the corrosion inhibitor compound is present in an amount effective to protect the surface of the aluminum flake pigment particles from corrosion in an aqueous environment having a basic pH.

7. The composition of claim 1, wherein the corrosion inhibitor compound is present in an amount between 15% and 100% by weight based on total pigment weight.

8. A process for treating aluminum flake pigment particles with a corrosion inhibitor compound, comprising the step of admixing aluminum flake pigment particles, corrosion inhibitor compound and water, wherein the inhibitor compound is the reaction product of
   (a) a water-soluble metal salt of a metal selected from the group consisting of yttrium and rare earth metals having atomic numbers of from 57 to 71, and
   (b) an anionic water-soluble metal salt selected from the group consisting of transition metal oxo-complexes, silicon salts and mixtures thereof.

9. The process of claim 8, wherein the water-soluble metal salt (a) used therein is cerous nitrate.

10. The process of claim 8, wherein the water-soluble salts of transition metal oxo-complexes include transition metals selected from the group consisting of titanium, vanadium, chromium, zirconium, niobium, molybdenum, hafnium, tantalum, tungsten and mixtures thereof.

11. The process of claim 8, wherein the transition metal oxo-complex includes a metal selected from the group consisting of tungsten, vanadium, molybdenum, and niobium.

12. The process of claim 8, wherein the water-soluble salt of the transition metal oxo-complex is selected from the group consisting of sodium tungstate, sodium molybdate, sodium metavanadate, sodium orthovanadate, sodium metasilicate, lithium meta-niobate, and mixtures thereof.

13. The process of claim 8, wherein the corrosion inhibitor compound is added to the slurry in an amount between 15 and 100% by weight based on total pigment weight.

14. An aqueous coating composition, comprising:
   a. a slightly soluble, time release corrosion inhibitor compound wherein the inhibitor compound comprises the reaction product of
      i) water-soluble metal salt of a metal selected from the group consisting of yttrium and rare earth metals and
      ii) an anionic water-soluble salt selected from the group consisting of transition metal oxo-complexes, silicon salts and mixtures thereof,
   b. aluminum flake pigment;
   c. at least one water-compatible polymer; and
   d. a crosslinking agent.

15. The aqueous coating composition of claim 14, further comprising (e) a water-soluble salt selected from the group consisting of trivalent and tetravalent salts of cerium, yttrium and lanthanum.

16. The aqueous coating composition of claim 15, wherein the water soluble metal salt (a) is cerous nitrate.

17. The aqueous coating composition of claim 15, wherein the transition metal oxo-complex is selected from the group consisting of sodium tungstate, sodium molybdate, sodium metavanadate, sodium orthovanadate, sodium metasilicate, lithium meta-niobate, and mixtures thereof.

18. The aqueous coating composition of claim 15, wherein the corrosion inhibitor compound is selected from the group consisting of cerous tungstate, cerous metavanadate, cerous orthovanadate, cerous metasilicate, cerous molybdate and cerous niobate.

19. The aqueous coating composition of claim 13, wherein the corrosion inhibitor (a) is present in an amount between 0.01 and 5.0 percent by weight based on total pigment weight.

20. The aqueous coating composition of claim 15, wherein the water-soluble salt (e), is selected from the group consisting of cerium sulfate, cerium triacetate, cerium isopropoxide, ammonium cerium nitrate, yttrium triacetate, lanthanum triacetate and cerium dioxide.

* * * * *